(12) United States Patent
Vadder et al.

(10) Patent No.: US 8,049,522 B2
(45) Date of Patent: Nov. 1, 2011

(54) ICE THICKNESS PROBE, ICE THICKNESS PROBE ASSEMBLY AND ICE THICKNESS MONITORING APPARATUS

(75) Inventors: Davey Joe Vadder, Manchester, MD (US); Jeffrey Michael Kane, Biglerville, PA (US); Arthur James Marshall, Thomasville, PA (US)

(73) Assignee: Evapco, Inc., Westminster, MD (US)

( * ) Notice: Subject to any disclaimer, the term of this patent is extended or adjusted under 35 U.S.C. 154(b) by 502 days.

(21) Appl. No.: 12/198,504

(22) Filed: Aug. 26, 2008

(65) Prior Publication Data

US 2010/0052703 A1 Mar. 4, 2010

(51) Int. Cl.
*G01R 27/08* (2006.01)
(52) U.S. Cl. ............... 324/699; 62/139; 62/59; 62/130; 248/74.1
(58) Field of Classification Search ............ 324/699
See application file for complete search history.

(56) References Cited

U.S. PATENT DOCUMENTS

| | | | | |
|---|---|---|---|---|
| 2,506,775 A * | 5/1950 | Calabrese | ............... | 62/139 |
| 3,484,805 A * | 12/1969 | Lorenz | ............... | 62/139 |
| 4,287,472 A * | 9/1981 | Pan et al. | ............... | 324/699 |
| 4,428,126 A * | 1/1984 | Banks | ............... | 33/412 |
| 4,497,179 A * | 2/1985 | Iwans | ............... | 62/59 |
| 4,688,437 A * | 8/1987 | Becker et al. | ............... | 73/866.5 |
| 4,745,804 A | 5/1988 | Goldberg et al. | | |
| 4,939,908 A * | 7/1990 | Ewing et al. | ............... | 62/139 |
| 4,996,493 A * | 2/1991 | Monat et al. | ............... | 324/699 |
| 5,163,298 A | 11/1992 | Hassell et al. | | |
| 5,193,286 A * | 3/1993 | Collier | ............... | 33/551 |
| 5,457,977 A | 10/1995 | Wilson | | |
| 5,461,325 A * | 10/1995 | Duggan | ............... | 324/756.04 |
| 5,502,977 A * | 4/1996 | Ziesel et al. | ............... | 62/139 |
| 5,704,220 A * | 1/1998 | Yamazaki | ............... | 62/259.2 |
| 5,865,034 A | 2/1999 | Wang | | |
| 6,173,926 B1 * | 1/2001 | Elvegaard | ............... | 248/74.1 |

(Continued)

FOREIGN PATENT DOCUMENTS

JP 06058895 A * 3/1994

OTHER PUBLICATIONS

PCT/ISA/220, App. No. PCT/US2009/055033 (2 pages).

(Continued)

*Primary Examiner* — Melissa Koval
*Assistant Examiner* — Benjamin M Baldridge
(74) *Attorney, Agent, or Firm* — Rader, Fishman & Grauer PLLC; Carl Schaukowitch

(57) ABSTRACT

An ice thickness probe includes a longitudinally-extending probe rod, an insulator casing and a sleeve. The probe rod is fabricated from an electrically-conductive material. The insulator casing is fabricated from an electrically-insulative material and is wrapped around, is in contact with and extends along the probe rod. The sleeve is fabricated from a stiff yet resilient material and is wrapped around, is in contact with and extends along the insulator casing. The insulator casing and the sleeve are concentrically disposed about the probe rod as viewed in cross-section. An ice thickness probe assembly includes a frame structure, a reference bar and at least one ice thickness probe. An ice thickness monitoring apparatus is used in a thermal storage coil having a tank containing water and a tube disposed in the water so that, when the thermal ice storage coil is energized, ice is produced and accumulates on the tube.

19 Claims, 17 Drawing Sheets

U.S. PATENT DOCUMENTS

| | | | | |
|---|---|---|---|---|
| 6,334,483 | B1 | 1/2002 | Berglund et al. | |
| 6,384,611 | B1 * | 5/2002 | Wallace et al. | 324/671 |
| 6,415,615 | B1 * | 7/2002 | Osborne et al. | 62/130 |
| 6,995,572 | B2 * | 2/2006 | Arndt et al. | 324/639 |
| 7,125,380 | B2 * | 10/2006 | Yager | 600/227 |
| 7,575,258 | B1 * | 8/2009 | Osei-Bosompem | 291/2 |
| 2003/0199738 | A1 * | 10/2003 | Yager | 600/227 |
| 2004/0003600 | A1 * | 1/2004 | Hawkins et al. | 62/59 |
| 2004/0156263 | A1 * | 8/2004 | McCann et al. | 366/299 |
| 2004/0159751 | A1 * | 8/2004 | Boon et al. | 248/74.1 |
| 2006/0001431 | A1 * | 1/2006 | Adami et al. | 324/446 |
| 2008/0271548 | A1 * | 11/2008 | Janz et al. | 73/866.5 |
| 2010/0176827 | A1 * | 7/2010 | Yamazaki et al. | 324/699 |
| 2010/0294053 | A1 * | 11/2010 | Kiesewetter et al. | 73/866.5 |

OTHER PUBLICATIONS

PCT/ISA/210 Int'l Search Report, Jan. 4, 2010 (3 pages).

PCT/ISA/237 Written Opinion (6 pages).

* cited by examiner

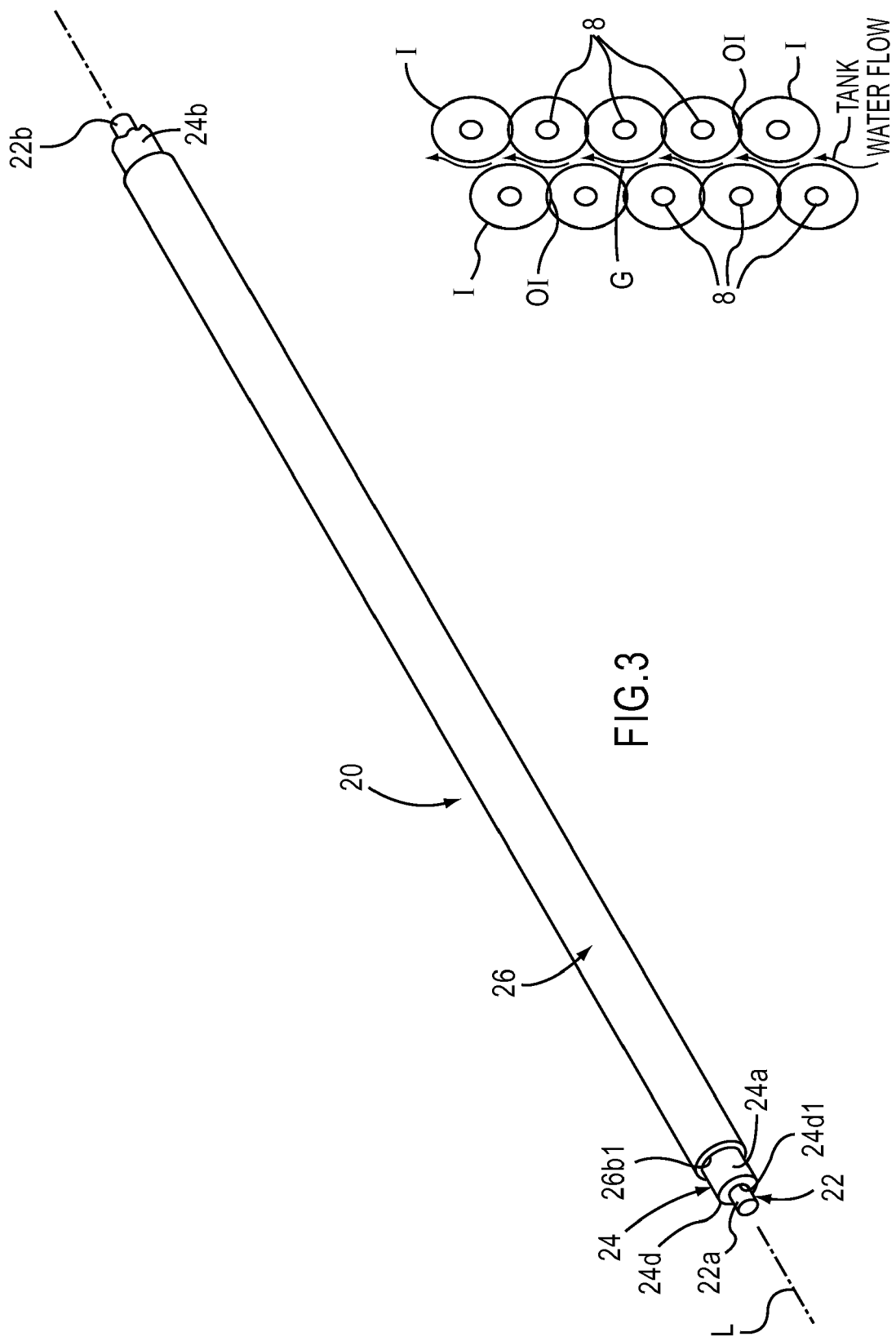

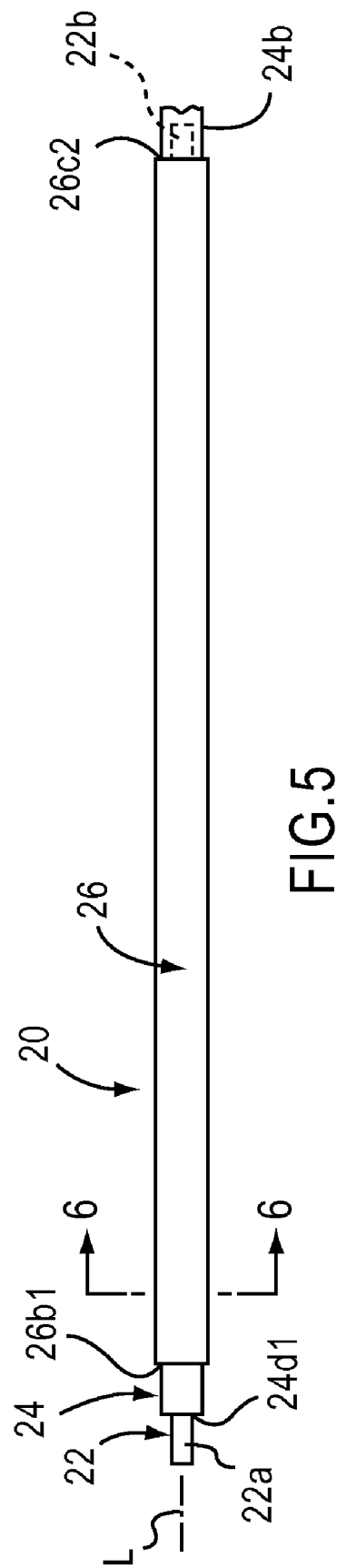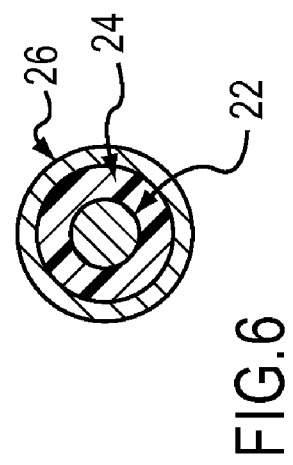

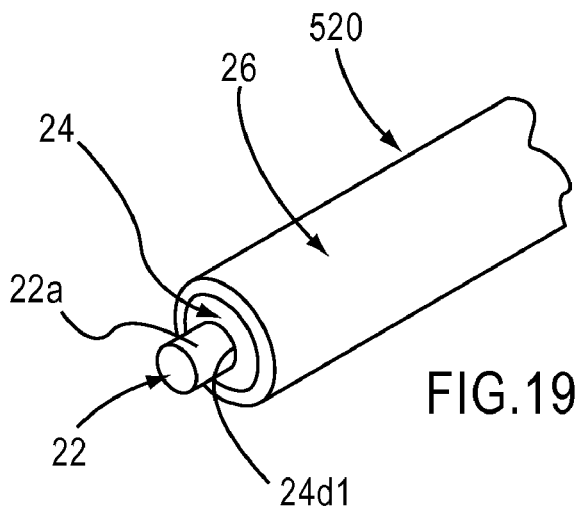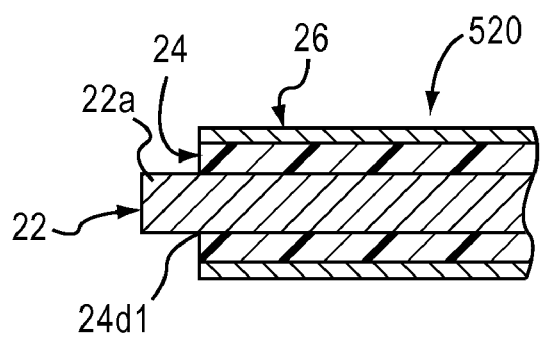
FIG.19  FIG.20
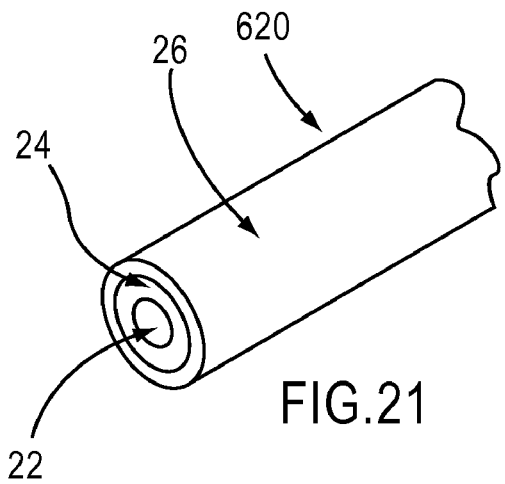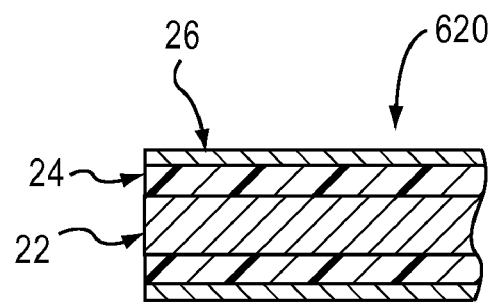
FIG.21  FIG.22
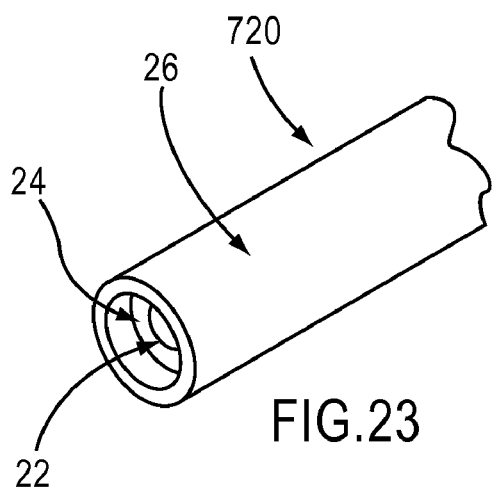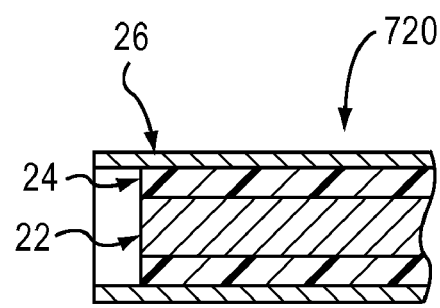
FIG.23  FIG.24

ICE THICKNESS PROBE, ICE THICKNESS PROBE ASSEMBLY AND ICE THICKNESS MONITORING APPARATUS

FIELD OF THE INVENTION

The present invention relates to an ice thickness probe, and ice thickness probe assembly and an ice thickness monitoring apparatus.

BACKGROUND OF THE INVENTION

Thermal storage systems have been in existence for many years. The purpose of a thermal storage system is to create thermal energy and store it for use at another time. In a typical thermal storage system, the refrigeration system, i.e., a chiller, generates ice at night when electrical utility rates are typically lowest (off-peak). During the day, when utility rates are higher (on-peak), the ice is then melted to provide, for example, cooling to a building.

One type of technology system that provides for thermal storage is referred to as "ice on coils". In this type of system, cylinders of ice are built onto tubes (coil tubes; also referred to as thermal storage coils). In many systems that use this technology, multiple banks of coils are submerged under water in concrete, metal or resin tanks.

Many thermal storage systems use glycol chillers to provide cooling necessary to generate ice on the coil tubes. Such thermal storage systems have two modes of operation, "ice build" and "ice melt". For ice build, the glycol chiller is energized during the off-peak period. The glycol chilling system generates low-temperature glycol that circulates through the coil tubes of the thermal storage coils. The circulating glycol removes heat from the water in the tank which causes water to freeze onto the exterior surface of the thermal storage coils. During ice melt, the glycol chilling system is shut off, i.e. de-energized. For one type of "ice melt" phase, the tank water is circulated over the ice built-up on the thermal storage coils to extract energy from the ice. The ice water is then circulated through a primary side of a heat exchanger.

A conventional component of one type of thermal storage system is a thermal storage coil assembly 2 as shown in FIG. 1. The thermal storage coil assembly 2 includes a tank 4 containing tank water (arrows in FIG. 2) and a plurality of thermal storage serpentine circuits 6 with each thermal storage serpentine circuit 6 including a plurality of horizontally-extending, integrally interconnected coil tubes 8.

As shown in FIG. 2, the geometry of the coil tubes 8 is such that ice I may overbuild (overbuilt ice OI) in the vertical direction but a vertically-extending clearance gap G is necessary between rows of horizontally-disposed coil tubes 8. Thus, the vertical clearance gap G between the rows of coil tubes 8 permits circulation of the tank water (illustrated as arrows in FIG. 2). Maintaining the clearance gap G as an open, serpentine, vertical passageway between the ice I building on respective one of the coil tubes 8 allows for efficient heat transfer between the tank water and the ice I on the coil tubes 8 of thermal storage serpentine circuits 6.

It is therefore beneficial to either measure or monitor the amount of ice that accumulates on the coil tubes 8 of the thermal storage serpentine circuits 6 to provide at least some assurance that the vertical clearance gap G is maintained throughout the ice build-up operation phase of the thermal storage system. There are several ways for measuring or monitoring the amount of ice I in the tank 4 of the thermal storage system. One method of measuring ice is by the level of tank water in the tank 4. Another method is to measure or monitor the amount of ice I accumulating on a coil tube 8 of a thermal storage serpentine circuit 6. One type of an ice thickness measuring device senses the thickness of the ice I by conductivity. Another conventional ice thickness measuring device 10, such as the one shown diagrammatically in FIG. 1, is placed on the coil tube 8 of the thermal storage serpentine circuit 6 to measure or monitor levels of the ice thickness to detect stages, i.e., percentages of full ice build, in the ice build cycle. When full ice build is reached, a controller 12 in electrical communication with the conventional ice thickness device 10, for example, by a wire 14, shuts off the glycol flow to the thermal storage coils 6 thereby discontinuing the ice build cycle.

The present invention provides an ice thickness probe, an ice thickness probe assembly and an ice thickness monitoring apparatus that are used to measure and/or monitor ice thickness and/or to shut off the thermal storage system when full ice build is reached.

SUMMARY OF THE INVENTION

An exemplary embodiment of an ice thickness probe of the present invention includes a longitudinally-extending probe rod, an insulator casing and a sleeve. The probe rod is fabricated from an electrically-conductive material. The insulator casing is fabricated from an electrically-insulative material and is wrapped around, is in contact with and extends along the probe rod. The sleeve is fabricated from a stiff yet resilient material and is wrapped around, is in contact with and extends along the insulator casing. The insulator casing and the sleeve are concentrically disposed about the probe rod as viewed in cross-section.

Another exemplary embodiment of an ice thickness probe assembly of the present invention includes a frame structure, a reference probe and at least one ice thickness probe. The frame structure includes a support member and a pair of clamp members connected to the support member. The support member is disposed between the pair of clamp members. The reference probe is connected to and extends from the frame structure. The reference probe is fabricated from an electrically conductive material. The at least one ice thickness probe is connected to and extends from the frame structure. The at least one ice thickness probe and the reference probe are disposed apart from one another. The at least one ice thickness probe includes a probe rod fabricated from an electrically conductive material.

Yet another exemplary embodiment of an ice thickness monitoring apparatus is adapted for use in a thermal storage coil assembly having a tank containing water and at least one coil tube initially disposed in the water so that, when the thermal ice storage coil assembly is energized, ice can be produced and accumulate on and around the at least one coil tube. The ice thickness probe assembly includes a frame structure, a reference probe, at least one ice thickness probe and a controller. The frame structure is releasably connected to the at least one coil tube. The reference probe is connected to and extends from the frame structure. The at least one ice thickness probe is connected to and extends from the frame structure with the ice thickness probe and the reference probe being disposed apart from one another. The controller is operative to transmit electrical signals to the reference probe so that the electrical signals received by the reference probe are transmitted to the at least one ice thickness probe via the water and is operative to receive electrical signals detected by and from the at least one ice thickness probe in the water until the at least one ice thickness probe is enveloped in ice.

The present invention will be better appreciated in view of the detailed description of the exemplary embodiments of the present invention with reference to the accompanying drawings, in which:

BRIEF DESCRIPTION OF THE DRAWINGS

FIG. 2 is a diagrammatical view illustrating a plurality of serpentine circuits in cross-section with ice builds formed thereon with a serpentine vertical clearance gap disposed between adjacent columns of the serpentine circuits.

FIG. 3 is a perspective view of a first exemplary embodiment of an ice thickness probe of the present invention.

FIG. 5 is a side elevational view of the ice thickness probe illustrated in FIG. 3.

FIG. 6 is a cross-sectional view taken a long line 6-6 and FIG. 5.

FIG. 19 is a partial perspective view of another exemplary embodiment of an ice thickness probe of the present invention.

FIG. 20 is a partial elevational view in cross-section of the ice thickness probe illustrated in FIG. 19.

FIG. 21 is a partial perspective view of yet another exemplary embodiment of an ice thickness probe of the present invention FIG. 22 is a partial elevational view in cross-section of the ice thickness probe illustrated in FIG. 21.

FIG. 23 is a partial perspective view of still yet another exemplary embodiment of an ice thickness probe of the present invention.

FIG. 24 is a partial elevational view in cross-section of the ice thickness probe illustrated in FIG. 23.

DETAILED DESCRIPTION OF THE EXEMPLARY EMBODIMENTS

Figure 1:
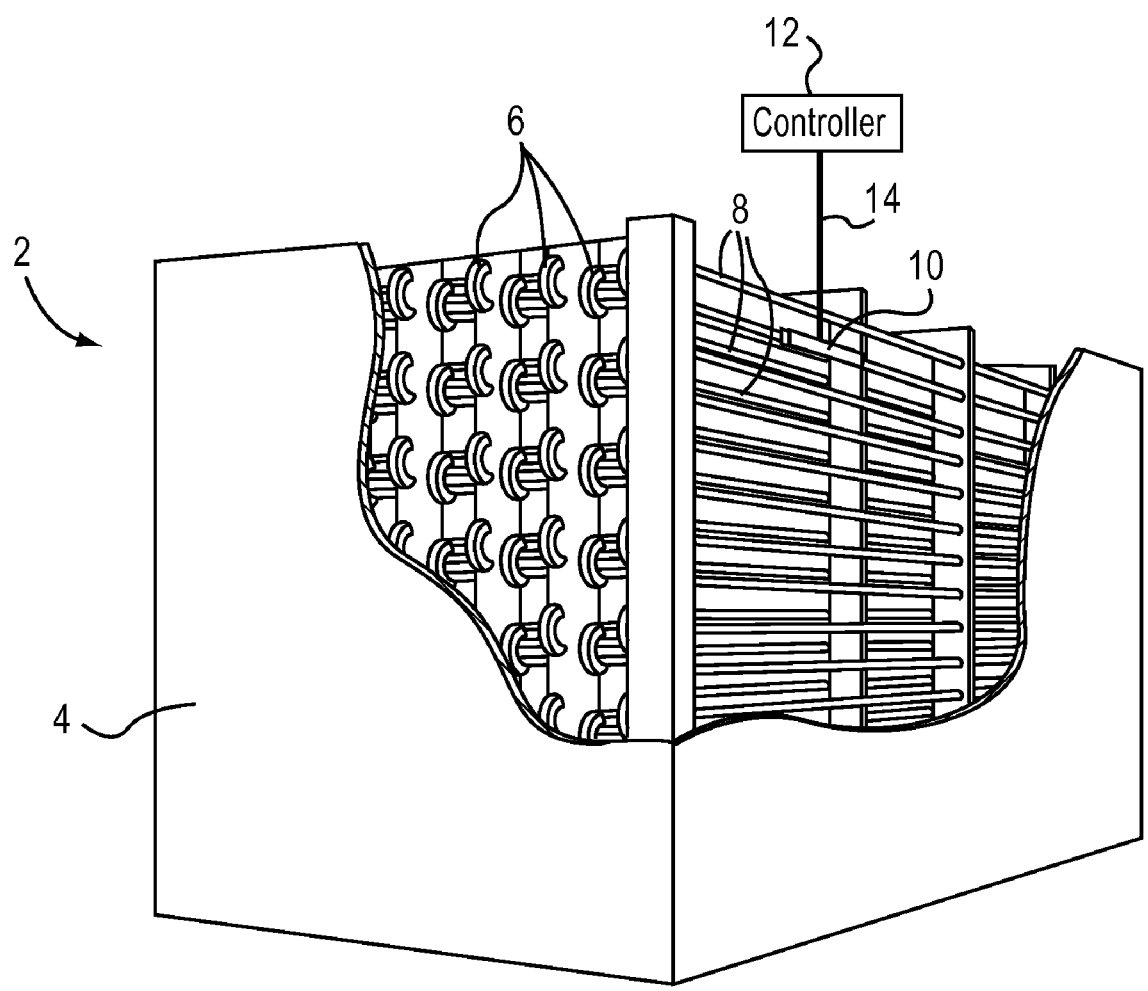
FIG. 1 is a perspective view shown partially broken away of conventional thermal storage coil assembly with a conventional ice thickness monitoring device connected to one of the serpentine circuits.

Hereinafter, embodiments of the present invention will be described with reference to the attached drawings. The structural components common to those of the prior art and the structural components common to respective embodiments of the present invention will be represented by the same symbols and repeated description thereof will be omitted.

A first exemplary embodiment of an ice thickness probe 20 of the present invention is hereinafter described with reference to FIGS. 3-6. As best shown in FIGS. 3-6, the ice thickness probe 20 includes a probe rod 22, an insulator casing 24 and a sleeve 26. The probe rod 22 extends along a longitudinal axis L and is fabricated from a stiff yet resilient, electrically-conductive material such as metal. For the first exemplary embodiment of the ice thickness probe 20, the probe rod 22 is fabricated from stainless steel, particularly, SST type 308L TIG filler rod having 0.075 diameter.

The insulator casing 24 is fabricated from an electrically-insulative material such as resin or rubber. As best shown in FIG. 6, the insulator casing 24 is wrapped around and is in contact with the probe rod 22 and, as that shown in FIG. 5, the insulator casing 24 extends at least substantially along the probe rod 22. By way of example only and not by way of limitation, the insulator casing 24 is a ⅛-inch polyolefin shrink tubing having a shrink ratio of 3:1.

The sleeve 26 is fabricated from a stiff yet resilient material such as metal or hard plastic. As best shown in FIG. 6, the sleeve 26 is wrapped around and in contact with the insulator casing 24 and, as a shown in FIG. 5, the sleeve 26 extends partially along the insulator casing 24. For the first exemplary embodiment of the ice thickness probe 20, the sleeve 26 is fabricated from stainless steel tubing, particularly, SST type 304 tubing, 10 gauge, 0.124 inches outer diameter and 0.106 inches inner diameter.

With reference to FIG. 6, the insulator casing 24 and the sleeve 26 are concentrically disposed about the probe rod 22 as viewed in cross-section. More specifically, the insulator casing 24 is wrapped around the probe rod 22 in a tight-fitting manner sufficient to prevent water from seeping between the interface of the insulator casing 24 and the probe rod 22. The sleeve 26 is wrapped around the insulator casing 24 in a tight-fitting manner sufficient to prevent water from seeping between the interface of the sleeve 26 and the insulator casing 24.

Figure 4:
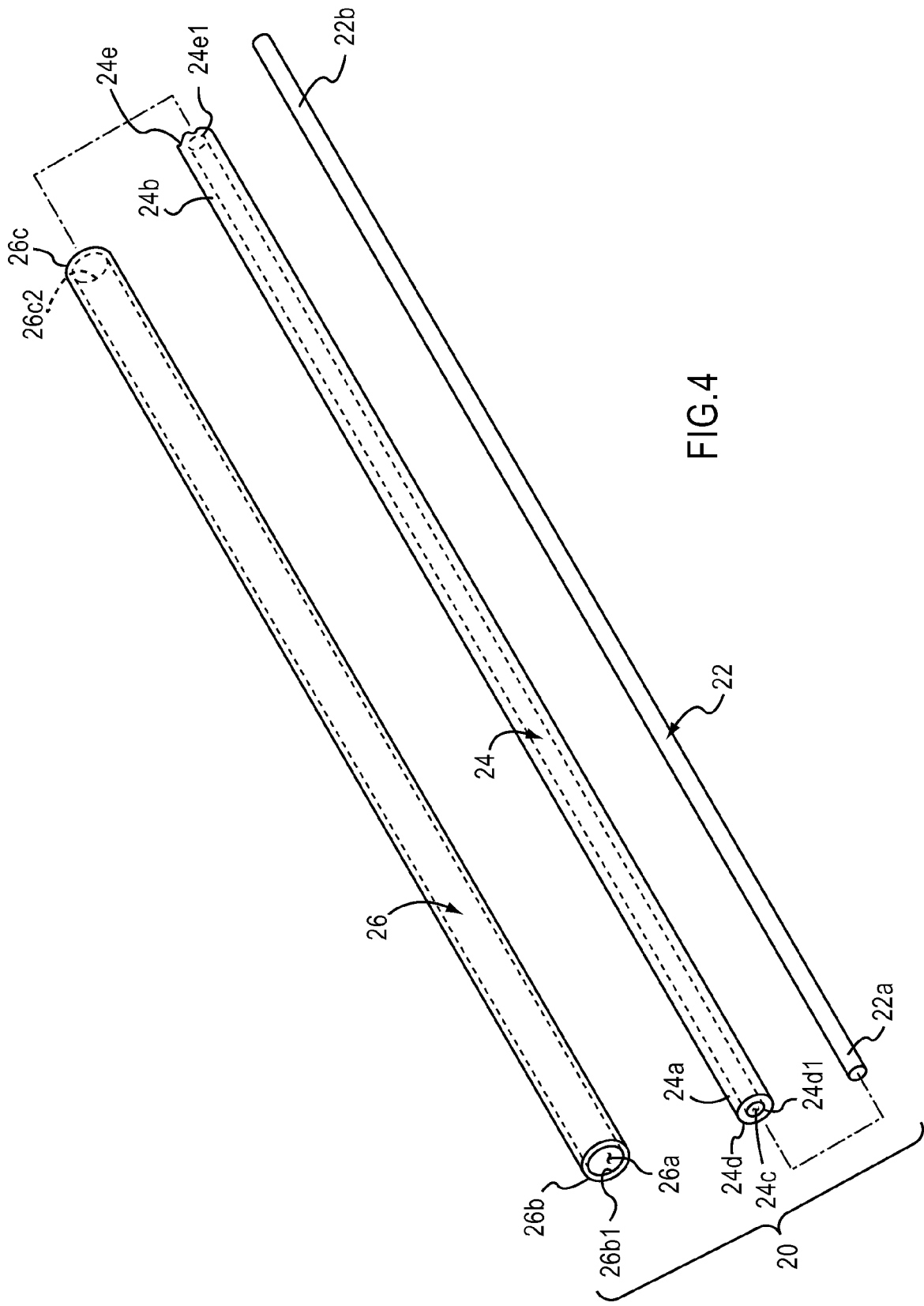
FIG. 4 is an exploded perspective view of the ice thickness probe illustrated in FIG. 3.

In FIG. 4, the sleeve 26 has a passageway 26a extending longitudinally therethrough. Also, the sleeve 26 has a first sleeve end 26b defines a first sleeve opening 26b1 into the passageway 26a and a second sleeve end 26c disposed opposite the first sleeve end 26b. The second sleeve end 26c defines a second sleeve opening 26c2 into the passageway 26a. In FIGS. 3 and 5, the insulator casing 24, received in the passageway 26a, has a first insulator casing end portion 24a and a second insulator casing end portion 24b disposed opposite the first insulator casing end portion 24a. By way of example only and not by way of limitation, the first insulator casing end portion 24a projects outwardly from the first sleeve opening 26b1.

In FIG. 4, the insulator casing 24 has an insulator casing hole 24c that extending longitudinally through the insulator casing 24 and a first insulator casing end 24d defining a first insulator casing opening 24d1 into the insulator casing hole 24c and a second insulator casing end 24e disposed opposite the first insulator casing end 24d. The second insulator casing end 24e defines a second insulator casing opening 24e1 into the insulator casing hole 24c. The probe rod 22, received in the insulator casing hole 24c, has a first probe rod end portion 22a and a second probe rod end portion 22b that is disposed opposite the first probe rod end portion 22a. As best shown in FIG. 5, the first probe rod end portion 22a projects outwardly from the first insulator casing opening 24d1 and the second probe rod end portion 22b and the second insulator casing end portion 24b project outwardly from the second sleeve opening 26c2. Further, the second insulator casing end portion 24b and second probe rod end portion 22b project outwardly from the second sleeve opening 26c2 and the second insulator casing end portion 24b covers the second probe rod end portion 22b.

Figure 7:
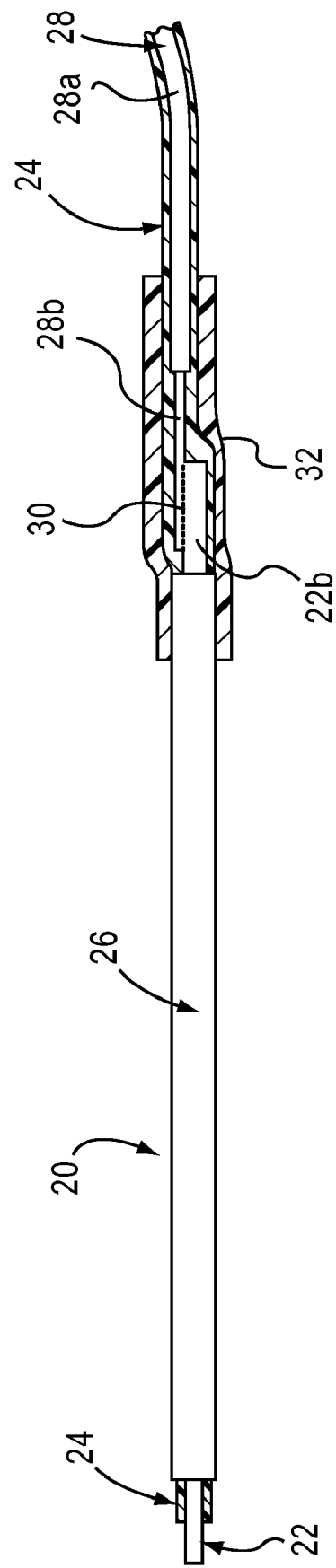
FIG. 7 is a side elevational view of the ice thickness probe in FIG. 3 connected to a conventional wire.

In FIG. 7, the first embodiment of the ice thickness probe 20 of the present invention is attached to a conventional wire 28 having a wire insulator casing 28a and an electrically-conductive wire core 28b. Note that the wire core 28b is connected to the second probe rod end portion 22b by a solder weldment 30. Also, note that the insulator casing 24 covers not only the wire core 28b, the solder weldment 30 and the second probe rod end portion 22b but also at least a portion of the wire insulator casing 28a. Furthermore, for the first embodiment of the ice thickness probe 20 of the present invention, a pliable jacket 32 is disposed in a tight-fitting manner around the second probe rod portion 22b and continues along so as to cover the solder weldment 30 as well as a portion of the wire 28 adjacent the solder weldment 30. One of ordinary skill in the art would appreciate that this pliable jacket 32 fabricated from a rubber or water-resistant material seals the connection between the ice thickness probe 20 and the wire 28. One of ordinary skill in the art would appreciate that alternative techniques could be used to cover the solder weldment 30 and the portion of the wire 28 adjacent the solder weldment 30.

A second exemplary embodiment of an ice thickness probe assembly 110 of the present invention is generally introduced In FIGS. 8-12. The ice thickness probe assembly 110 includes a frame structure 112, a reference bar 114 and one ice thickness probe 20 (discussed above). The frame structure 112 has a support member 116 and a pair of clamp members 118 connected to the support member 116. The support member 116 is disposed between the pair of clamp members 118. A skilled artisan would appreciate that the pair of clamp members 118 releasably connects the ice thickness probe assembly 110 to a portion of a tube 8 discussed hereinabove.

The reference bar 114 is connected to and extends from the frame structure 112. The reference bar 114 is fabricated from an electrically conductive material such as metal. The ice thickness probe 20 is connected to and extends from the frame structure 112. The ice thickness probe 20 and the reference bar 114 are disposed apart from one another.

Figure 10:
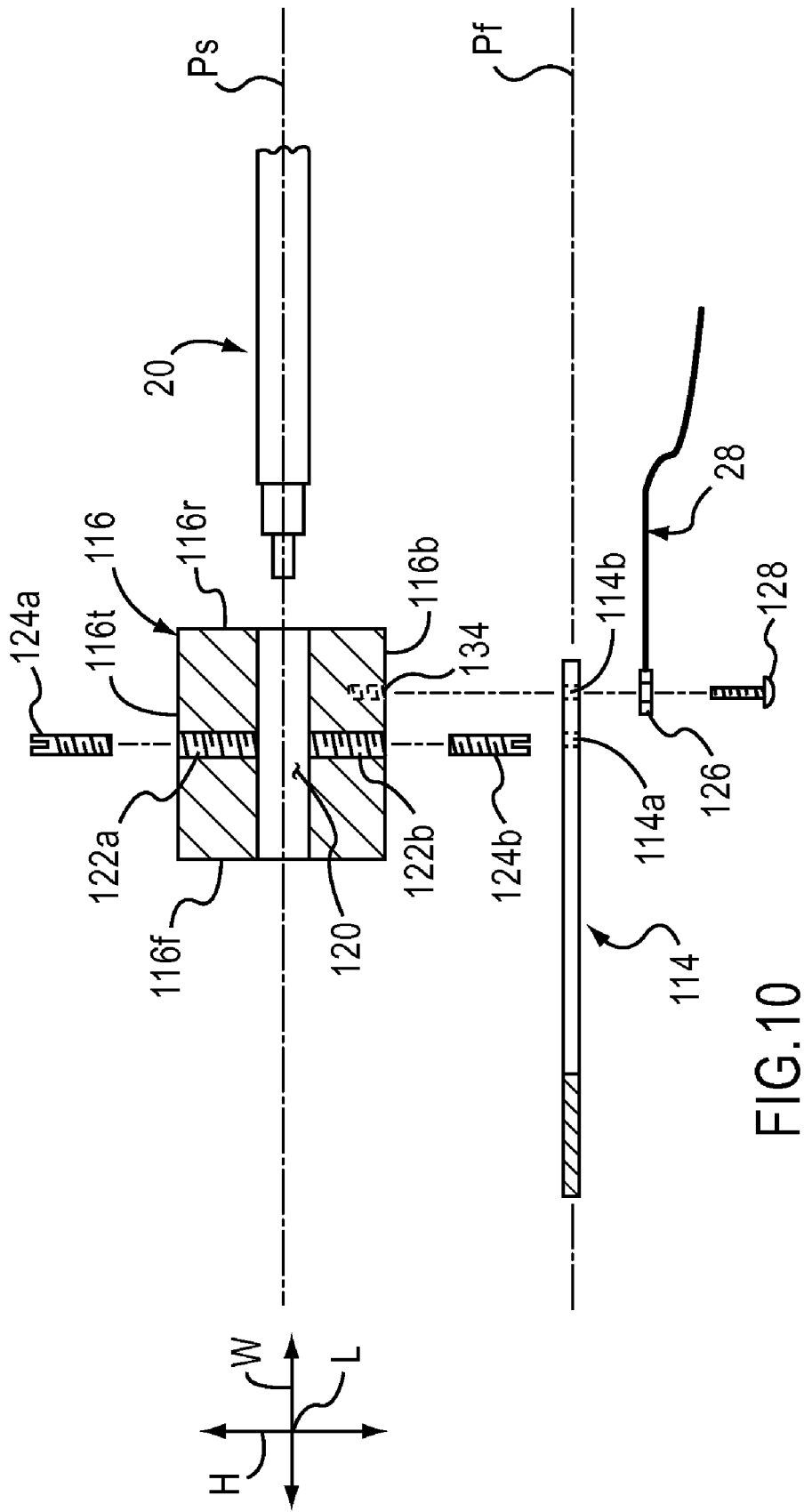
FIG. 10 is a cross-sectional view taken a long line 10-10-10 in FIG. 8 with the ice thickness probe disposed apart from a frame structure.

With reference to FIG. 10, the support member 116 includes one probe-receiving hole 120 that extends through the support member 116. The probe-receiving hole 120 is sized to slidably receive the ice thickness probe 20. Also, the support member 116 includes at least one threaded hole 122a. The threaded hole 122a extends perpendicularly from the probe-receiving hole 120 and is in communication with the probe-receiving hole 120. Although not by way of limitation, a fastener 124a such as a set screw is matably engaged with the threaded hole 122a. As viewed in FIGS. 10-12, when the probe-receiving hole 120 receives the ice thickness probe 20, the fastener 124a can be advanced in the threaded hole 122 so that it contacts the ice thickness probe 20 to secure the ice thickness probe 20 in the probe-receiving hole 120. A skilled artisan would appreciate that this particular arrangement of the probe-receiving hole 120, the threaded hole 122a and the fastener 124a enables a user to adjust the position of the probe 20 relative to the support member 116 as shown drawn in phantom in FIGS. 11 and 12.

Furthermore, as shown in FIG. 10, the support member 116 might include another threaded hole 122b. The threaded hole 122b extends perpendicularly from the probe-receiving hole 120 and is in communication with the probe-receiving hole 120. Although not by way of limitation, another fastener 124b such as a set screw is matably engaged with the threaded hole 122b. As viewed in FIGS. 10-12, when the probe-receiving hole 120 receives the ice thickness probe 20, the fastener 124b can be advanced in the threaded hole 122b so that it contacts the ice thickness probe 20 to secure the ice thickness probe 20 in the probe-receiving hole 120.

Figure 8:
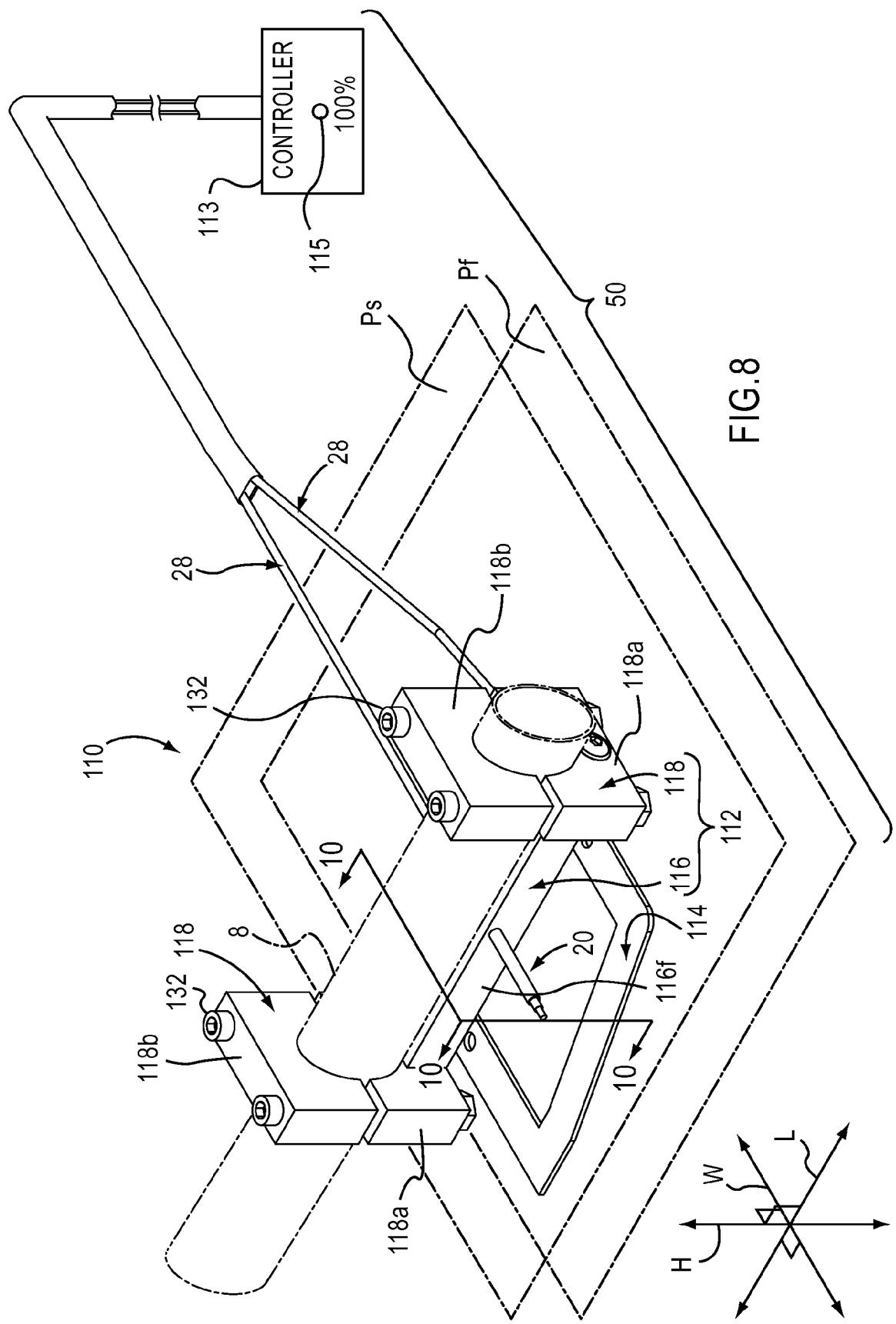
FIG. 8 is a top perspective view of a second exemplary embodiment of an ice thickness probe assembly of the present invention.
Figure 9:
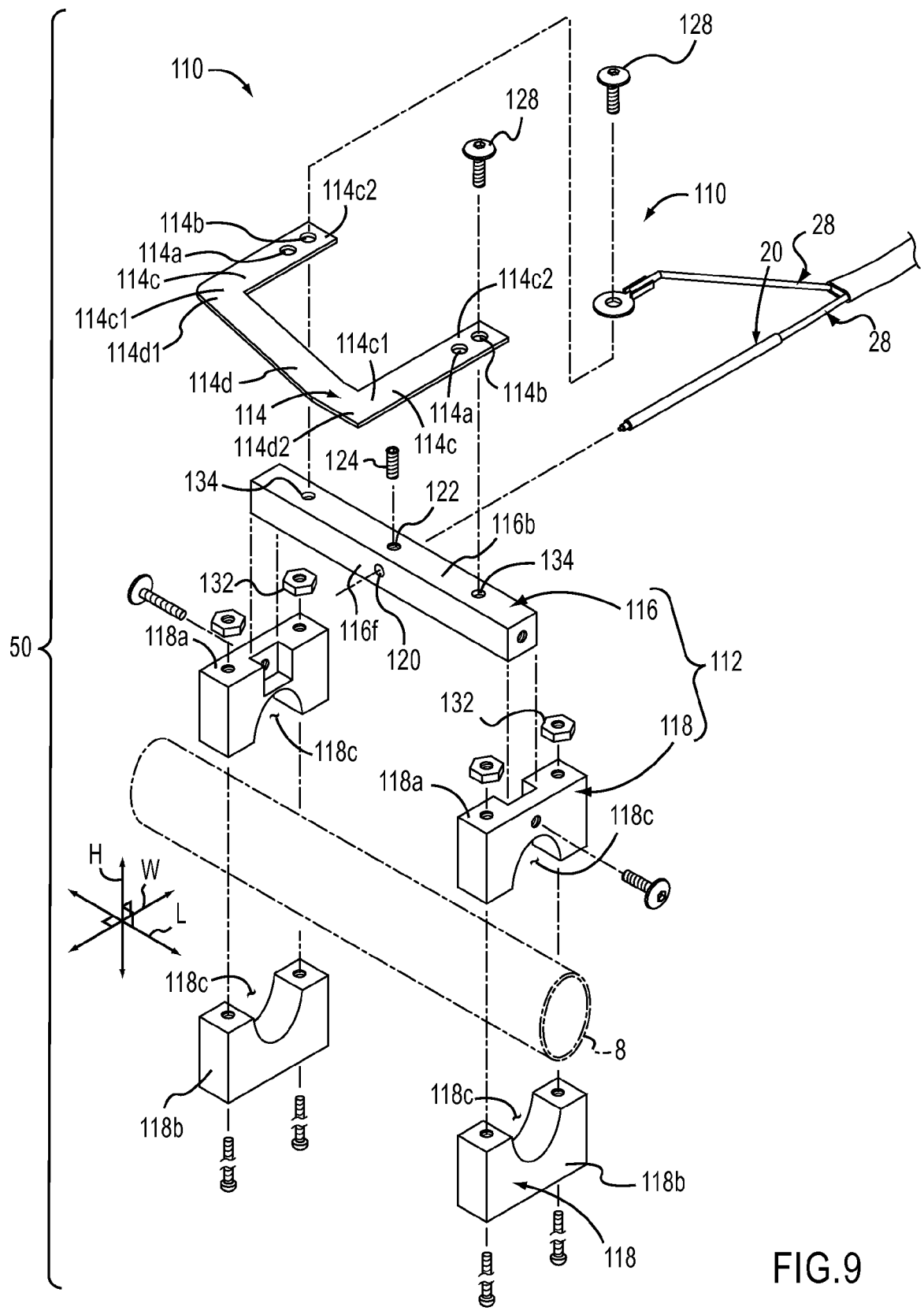
FIG. 9 is an exploded bottom perspective view of the ice thickness probe assembly shown in FIG. 8

In FIGS. 8 and 9, the support member 116 extends in a length-wise direction L, a width-wise direction W and a height-wise direction H. by way of example only and not by way of limitation, the support member 116 is rectangularly shaped as viewed in cross section in FIG. 10 along the width-wise direction W and the height-wise direction H. The support member 116 has a front surface 116f, a rear surface 116r, a top surface 116t and a bottom surface 116b. The front surface 116f and the rear surface 116r extend parallel to one another in the length-wise direction L and the height-wise direction H. The top surface 116t and the bottom surface 116b extend parallel to one another in the length-wise direction L and width-wise direction W and interconnect the front surface 116f and rear surface 116r. The support member 116 has the probe-receiving hole 120 extending through the front and rear surfaces 116f and 116r respectively. The probe-receiving hole 120 is sized to slidably receive the ice thickness probe 20.

As shown in FIGS. 9-12, the reference bar 114 is connected to the bottom surface 116b of the support member 116. Although by way of example only and not by way of limitation, the reference bar 114 includes a first attachment hole 114a and a second attachment hole 114b a shown in FIG. 10. The wire 28 is connected to an eyelet 126. A skilled artisan would appreciate that the reference bar 114 and the wire 28 via the eyelet 126 connects to the bottom surface 116b of the support member 116 by a fastener 128 such as a screw that threadably mates with a threaded attachment hole 134 into the bottom surface 116b of the support member 116. Note that the user can choose to connect the reference bar 14 to the bottom surface 116b of the support member 116 through either the first attachment hole 114a or to second attachment hole 114b depending on how far from the support member 116 the reference bar 114 should project.

As best shown in FIG. 9, the reference bar 114 includes a pair of arms 114c and a cross member 114d interconnecting the pair of arms 114c to form a skewed U-shaped configuration. The pair of arms 114c and the cross member 114d interconnecting the pair of arms 114c form an integral construction. For the second exemplary embodiment of the ice thickness probe assembly 110, the reference bar 114 is fabricated from stiff yet resilient flat strip material that is electrically conductive. Each one of the pair of arms 114c has a connecting arm end portion 114c1 integrally connected to opposing ends 114d1 and 114d2 of the cross member 114d. Each one of the pair of arms 114c extends from the connecting arm end portion 114c1 and terminates in a free arm end portion 114c2. As illustrated in FIG. 9, the reference probe 20 is fastened to the bottom surface 116b of the support member 116 at respective ones of the free arm end portions 114c2, by way of example only, through the second attachment holes 114b (see FIG. 10) via fasteners 128 such as screws.

Figure 11:
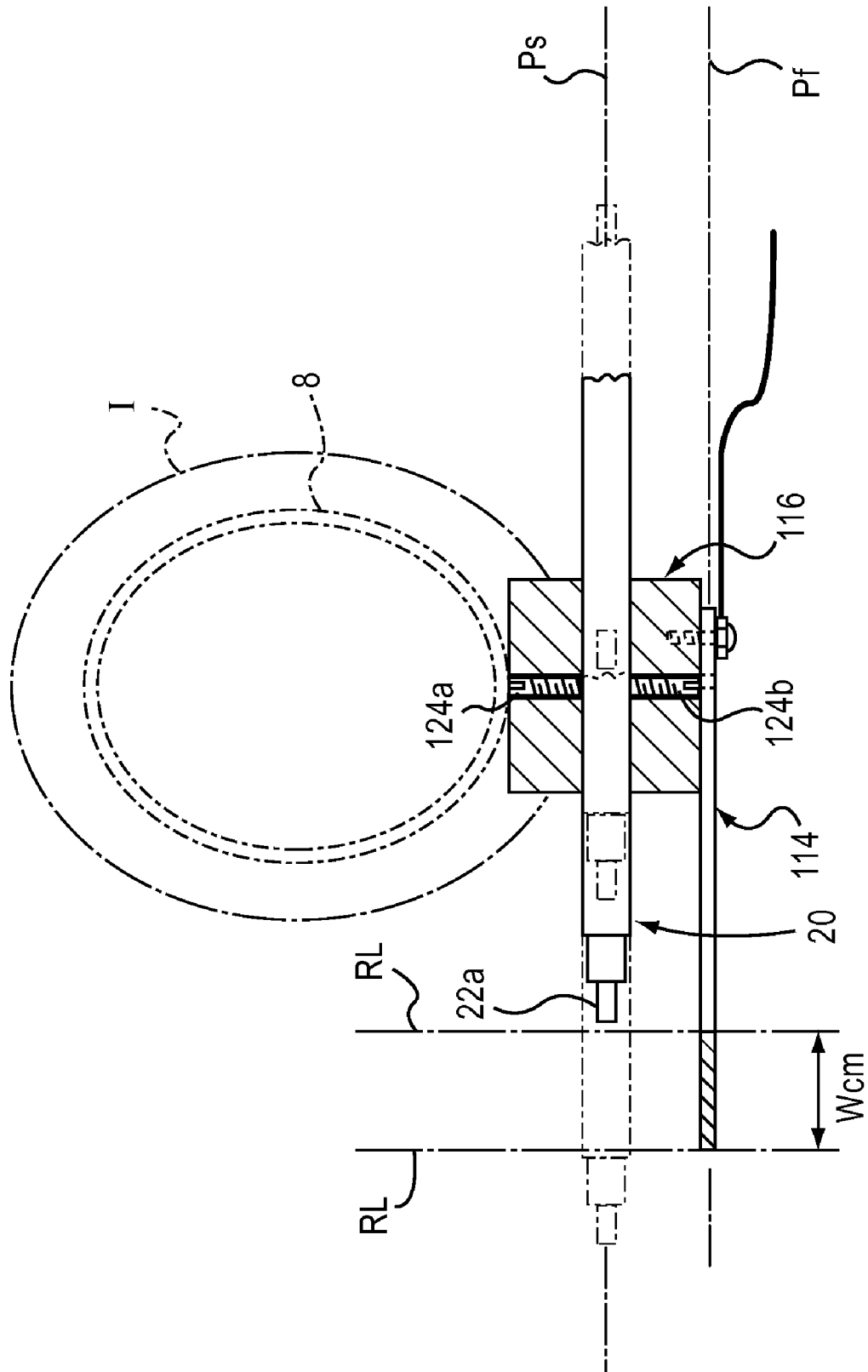
FIG. 11 is a cross-sectional view of FIG. 10 with the ice thickness probe inserted into the frame structure and with ice accumulating on a coil tube.
Figure 12:
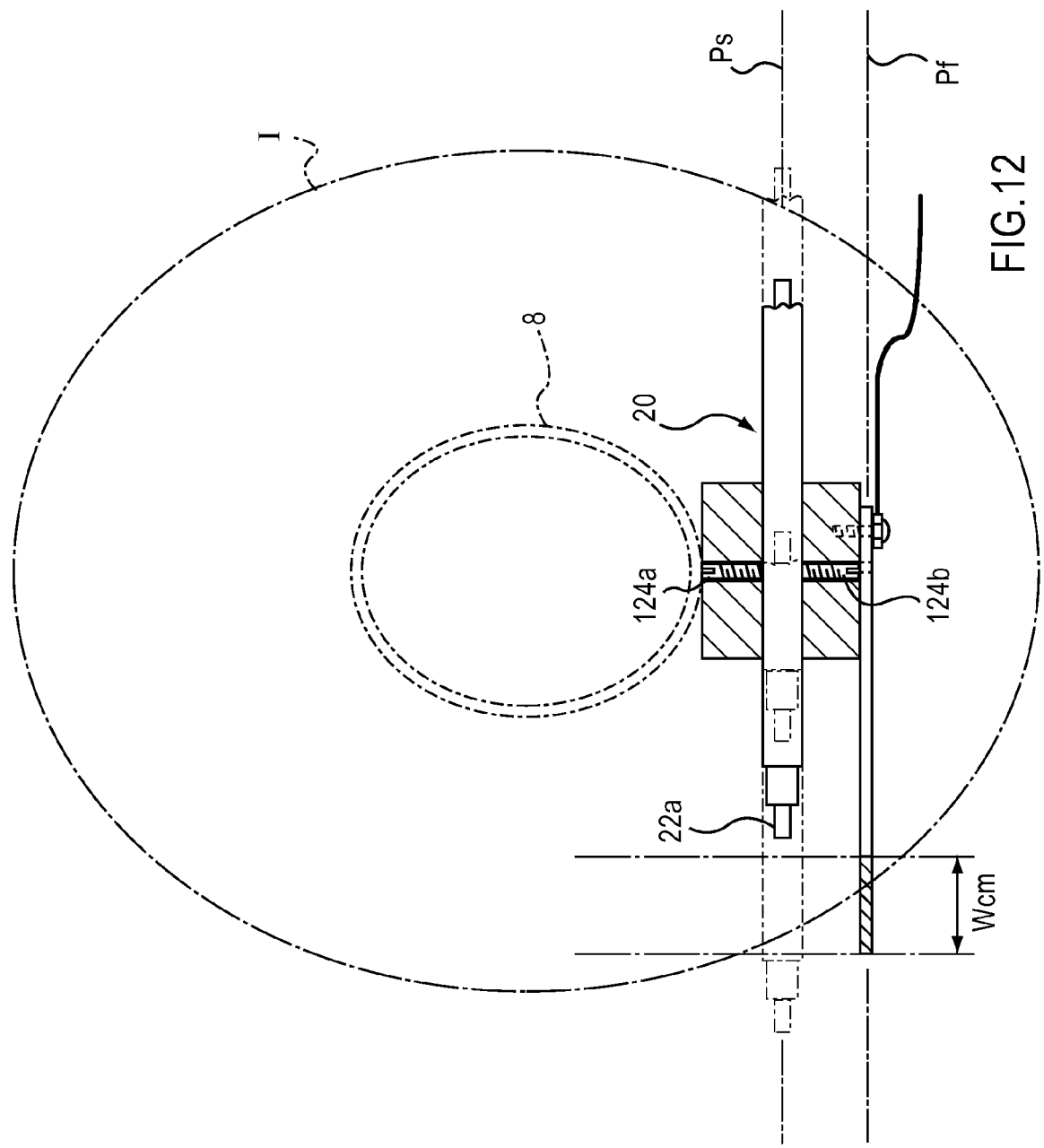
FIG. 12 is a cross-sectional view of FIG. 10 with the ice thickness probe inserted into the frame structure with the accumulating ice enveloping the ice thickness probe.

Further, as best shown in FIGS. 11 and 12 and by way of example only, the first probe rod end portion 22a of the ice thickness probes 20 is disposed above and slightly behind the cross-member 114d of the reference bar 114. The imaginary reference lines RL represent a width Wcm of the cross-member 114d as viewed in cross-section. A skilled artisan would appreciate that the ice thickness probe 20 can be adjusted such that the first probe rod end portion 22a can be disposed above the cross-member 114d and within the width Wcm of the cross-member 114d, if desired.

In FIGS. 8 and 9, each clamp member 118 includes a first half-block clamp part 118a and a second half-block clamp part 118b. The first half-block clamp part 118a and a second half-block clamp part 118b are releasably connected to each other via fasteners 132 such as nuts and bolts. The support member 116 is connected to and between respective ones of the first half-block clamp block parts 118a. Respective ones of the first and second half-block clamp parts 118a and 118b are generally U-shaped in configuration and each one of the first and second half-block clamp parts 118a and 118b defines a U-shaped tube-receiving channel 118c. As would be appreciated by a skilled artisan, the U-shaped tube-receiving channels 118c are sized to receive approximately one-half of the tube 8 as viewed in cross-section so that, upon connecting the first and second half-block clamp parts 118a and 118b together, the ice thickness probe assembly is securely connected to the tube 8.

Figure 13:
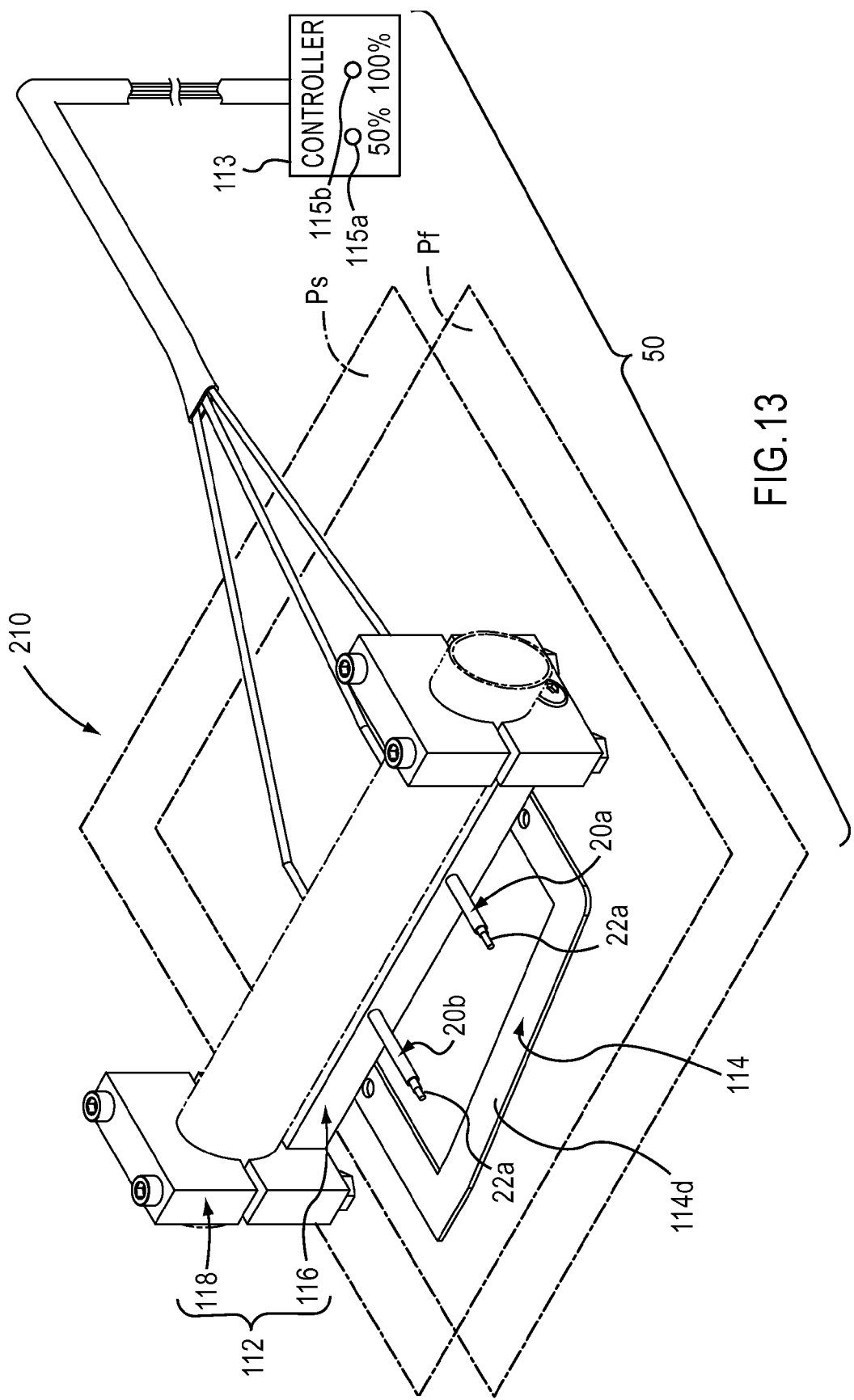
FIG. 13 is a top perspective view of a third exemplary embodiment of an ice thickness probe assembly of the present invention.
Figure 14:
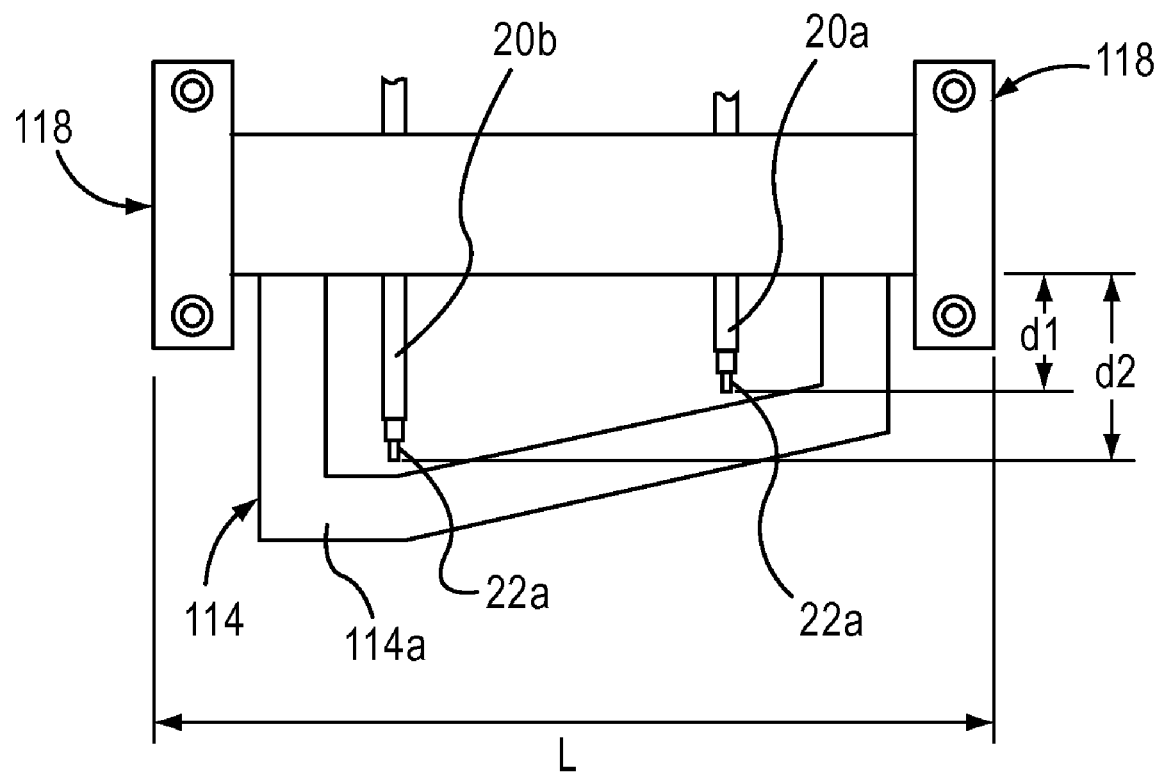
FIG. 14 is a top planner view of the ice thickness probe assembly illustrated in FIG. 13.

A third exemplary embodiment of an ice thickness probe assembly 210 is illustrated in FIGS. 13 and 14. The third exemplary embodiment of the ice thickness probe assembly 210 is substantially similar to the second exemplary embodiment of the ice thickness probe assembly 110 described above. However, the difference is that the third exemplary embodiment of the ice thickness probe assembly 210 includes a plurality of ice thickness probes, i.e. a first ice thickness probe 20a and a second ice thickness probe 20b projecting from the support member 116 of the frame structure 112 and are disposed apart from one another in the longitudinal direction L. The first ice thickness probe 20a extends from the support member 116 of the frame structure 112 a first distance d1 and the second ice thickness probe 20b extends from the support member 116 of the frame structure 112 a second distance d2 for the reason discussed below. Note that the second distance d2 is greater than the first distance d1. Further, as best shown in FIGS. 13 and 14, at least the first probe rod end portion 22a of both the first and second ice thickness probes 20a and 20b respectively is disposed above and slightly behind the cross-member 114d of the reference bar 114.

Figure 15:
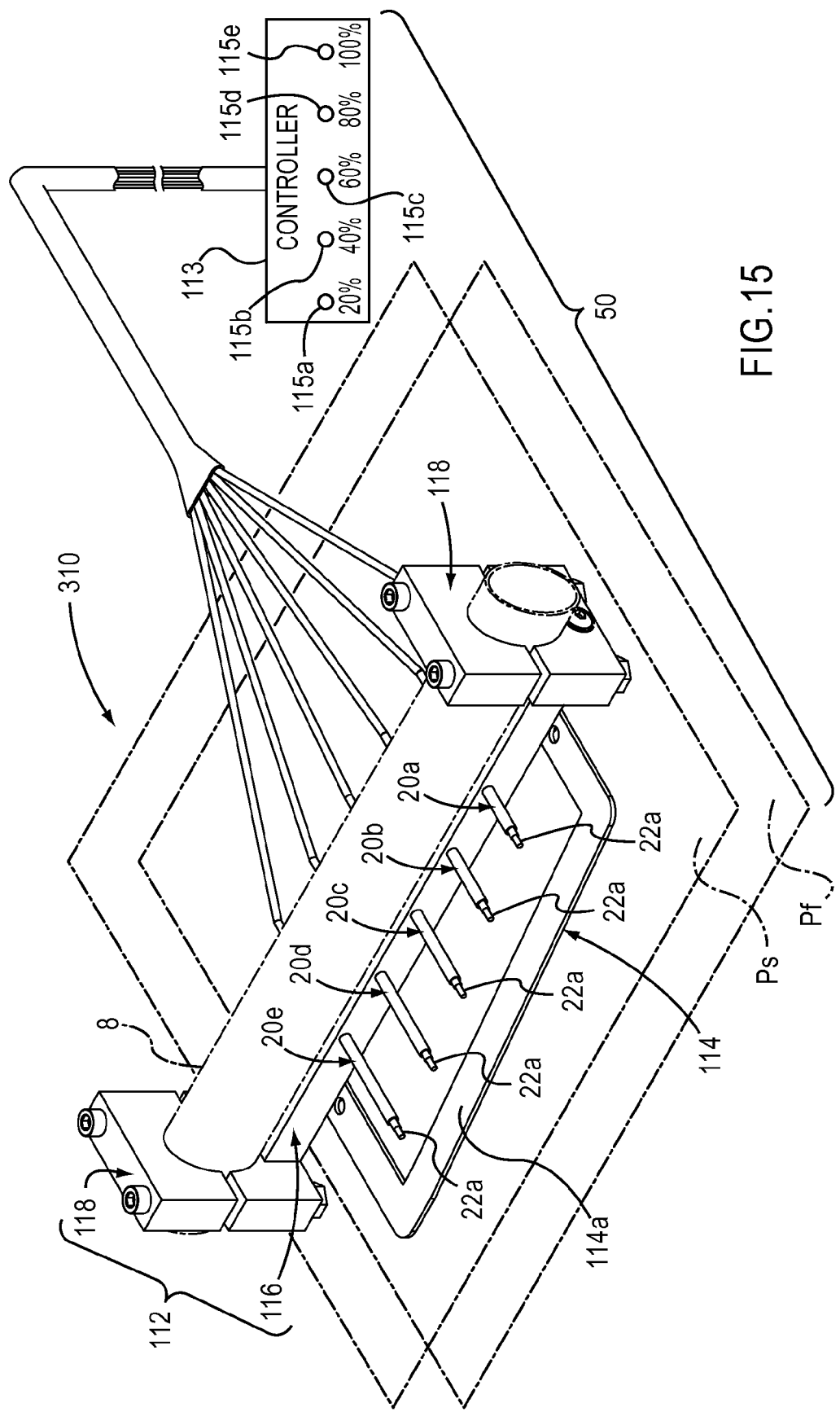
FIG. 15 is a top perspective view of a fourth exemplary embodiment of an ice thickness probe assembly of the present invention.
Figure 16:
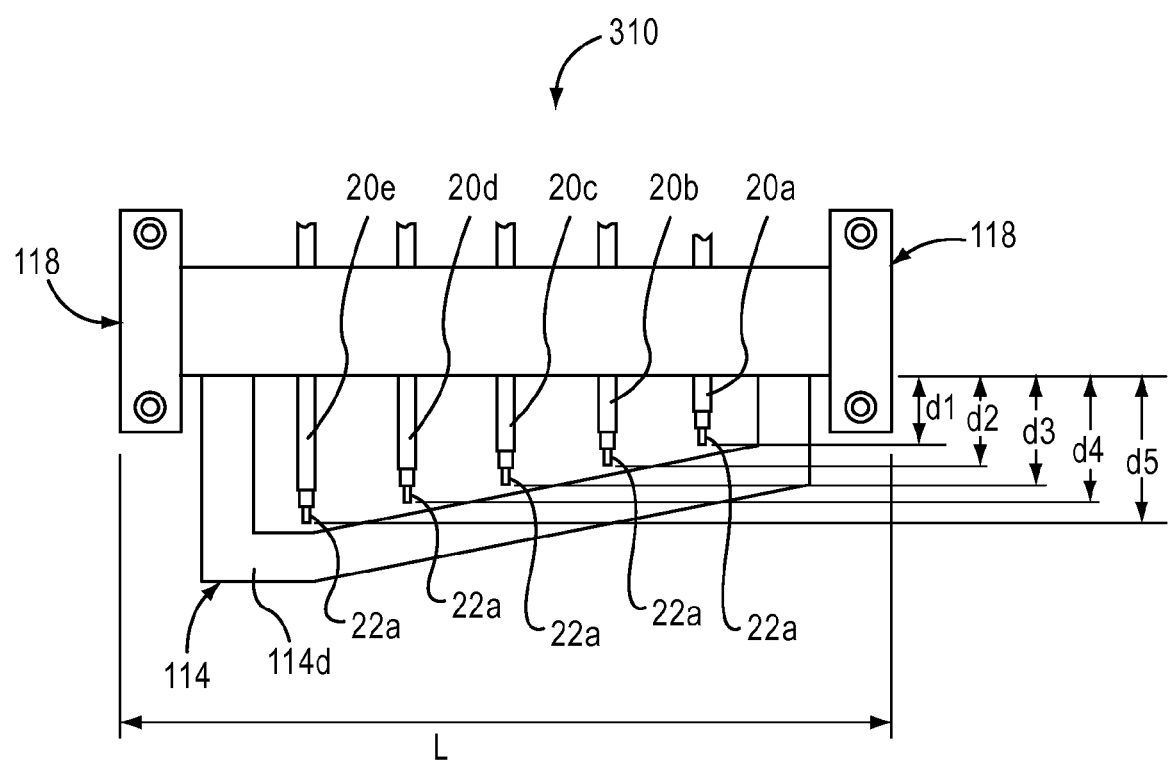
FIG. 16 is a top planner view of the ice thickness probe assembly illustrated in FIG. 15.

A fourth exemplary embodiment of an ice thickness probe assembly 310 is illustrated in FIGS. 15 and 16. The fourth exemplary embodiment of the ice thickness probe assembly 310 is substantially similar to the first and second exemplary embodiments of the ice thickness probe assembly 110 and 210 respectively described above. However, the difference is that the fourth exemplary embodiment of the ice thickness probe assembly 310 includes a plurality of ice thickness probes, i.e., by way of example, a first ice thickness probe 20a, a second ice thickness probe 20b, a third ice thickness probe 20c, a fourth ice thickness probe 20d and a fifth ice thickness probe 20e, projecting from the support member of the frame structure 116 and are disposed apart from one another in the longitudinal direction L.

The first ice thickness probe 20a extends from the support member 116 of the frame structure 112 the first distance d1, the second ice thickness probe 20b extends from the support member 116 of the frame structure 112 the second distance d2, a third ice thickness probe 20c extends from the support member 116 of the frame structure 112 a third distance d3, a fourth ice thickness probe 20d extends from the support member 116 of the frame structure 112 a fourth distance d4 and a fifth ice thickness probe 20e extends from the support member 116 of the frame structure 112 a fifth distance d5 for the reason discussed below. Note that the fifth distance d5 is greater than the fourth distance d4, the fourth distance d4 is greater than the third distance d3, the third distance d3 is greater than the second distance d2 and the second distance d2 is greater than the first distance d1. Further note that at least the first probe rod end portion 22a of each one of the plurality of ice thickness probes 20a-20e respectively is disposed above and slightly behind the cross-member 114d of the reference bar 114.

Figure 17:
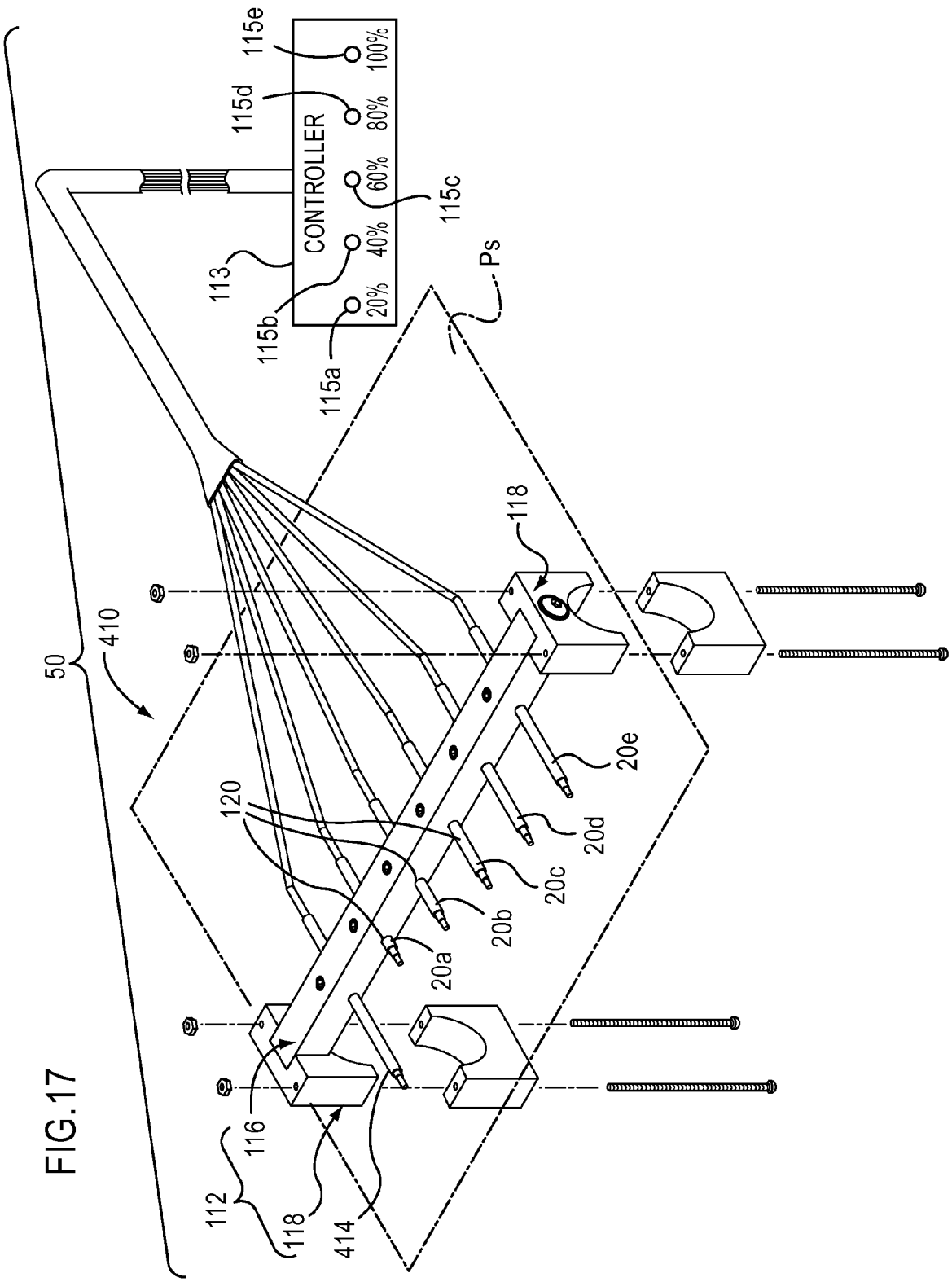
FIG. 17 is a top perspective view of a fifth exemplary embodiment of an ice thickness probe assembly of the present invention.

A fifth exemplary embodiment of an ice thickness probe assembly 410 is illustrated in FIG. 17. The fifth exemplary embodiment of the ice thickness probe assembly 410 is substantially similar to the first, second, third and fourth exemplary embodiments of the ice thickness probe assembly 110, 210, 310 and 410 respectively described above except for a reference bar 414. The reference bar 414 is constructed identically as an ice thickness probe 20. In this fifth exemplary embodiment of the ice thickness probe assembly 410, the support member includes a plurality of probe-receiving holes that extend through the front and rear surfaces 116f and 116r of the support member 116 and are sized to slidably receive respective ones of the plurality of ice thickness probes 20a-20e and the reference bar 414.

The fifth ice thickness probe 20e extends from the support member 116 of the frame structure 112 at the fifth distance d5 while the reference bar 414 of the fifth exemplary embodiment of the ice thickness probe assembly extends from the support member 116 of the frame structure 112 a distance dr. It is appreciated that the distance dr is at least equal to or greater than the distance d5.

With reference to FIG. 1 and with the ice thickness probe and the exemplary embodiments of the ice thickness probe assemblies discussed above, an ice thickness monitoring apparatus 50 shown in FIGS. 8, 9, 13, 15 and 17 is adapted for use in the thermal storage coil assembly 2 having the tank 4 containing water (arrows in FIG. 2) and at least one coil tube 8 initially disposed in the water so that, when the thermal ice storage coil assembly 2 is energized, ice I can be produced and accumulate on and around the at least one coil tube 8. The ice thickness probe monitoring apparatus includes the frame structure 112 releasably connected to the at least one coil tube 8, the reference bar 114 or 414 that is connected to and extends from the frame structure 112, at least one ice thickness probe 20 connected to and extending from the frame structure 112 with the ice thickness probe 20 and the reference bar 114 or 414 being disposed apart from one another and a controller 113 shown in FIGS. 8, 9, 13, 15 and 17.

The controller 113 is operative to transmit electrical signals to the reference bar 114 or 414 so that the electrical signals received by the reference bar 114 or 414 are transmitted to the at least one ice thickness probe 20 via the water and the controller 113 is further operative to receive electrical signals detected by and from the at least one ice thickness probe 20 in the water until the at least one ice thickness probe 20 is enveloped in ice I as shown in FIG. 12.

In FIGS. 8 and 9, the controller 113 is operative to switch a light source 115 in an ON state when ice envelopes the ice thickness probe 20 (FIG. 12) and the controller 113 is operative to de-energize the thermal storage coil assembly 2 thereby preventing the production of ice I when ice envelopes the ice thickness probe 20. In other words, for the second exemplary embodiment, the light source 115 in the ON state indicates to a user that there is a full ice-build state (100% ice build). Also, the controller 113 de-energizes the thermal storage coil assembly 2 thereby preventing the production of ice when ice I envelopes the ice thickness probe 20.

In FIG. 13, the controller 113 is operative to switch a first light source 115a in the ON state when the first ice thickness probe 20a is enveloped in ice I but the thermal storage coil assembly 2 thereafter continues to produce ice. Although not by way of limitation but by way of example only, the first light source 115a being in the ON state indicates to the user that the level of ice is 50% of full ice build. Even with the first light source 115a being in the ON state, the thermal storage coil assembly 2 continues to produce ice. When the second ice thickness probe 20b is enveloped in ice I, a second light source 115b is switched to the ON state to reflect the full ice build state (100% ice build). At 100% ice build, the controller 113 de-energizes the thermal storage coil assembly 2 thereby preventing the production of ice when ice I envelopes the second ice thickness probe 20b.

In FIGS. 15 and 17, the controller 113 is operative to switch a series of light sources, namely, by way of example only, a first light source 115a, a second light source 115b, a third light source 115c, a fourth light source 115d and a fifth light source 115e, in the ON state as the associated ice thickness probes, namely, first ice thickness probe 20a, ice thickness probe 20b, ice thickness probe 20c, ice thickness probe 20d and ice thickness probe 20e, are enveloped in ice I. One of ordinary skill in the art would appreciate that the respective distances d1-d5 are calibrated in a manner so that the respective ice thickness probes 20a-20e when enveloped by ice represent to the user the at least approximate proportionate ice build percentages 20%-100% as shown in FIG. 15. As ice continues to build and accumulate on the coil tube 8 and as ice envelopes the respective ones of the ice thickness probes 20a-20e, respective ones of the light sources 115a-115e are switched in the ON state by the controller 13. It follows that the thermal storage coil assembly 2 continues to produce ice until the ice thickness probe 20e is enveloped in ice which represents 100% ice build.

Figure 18:
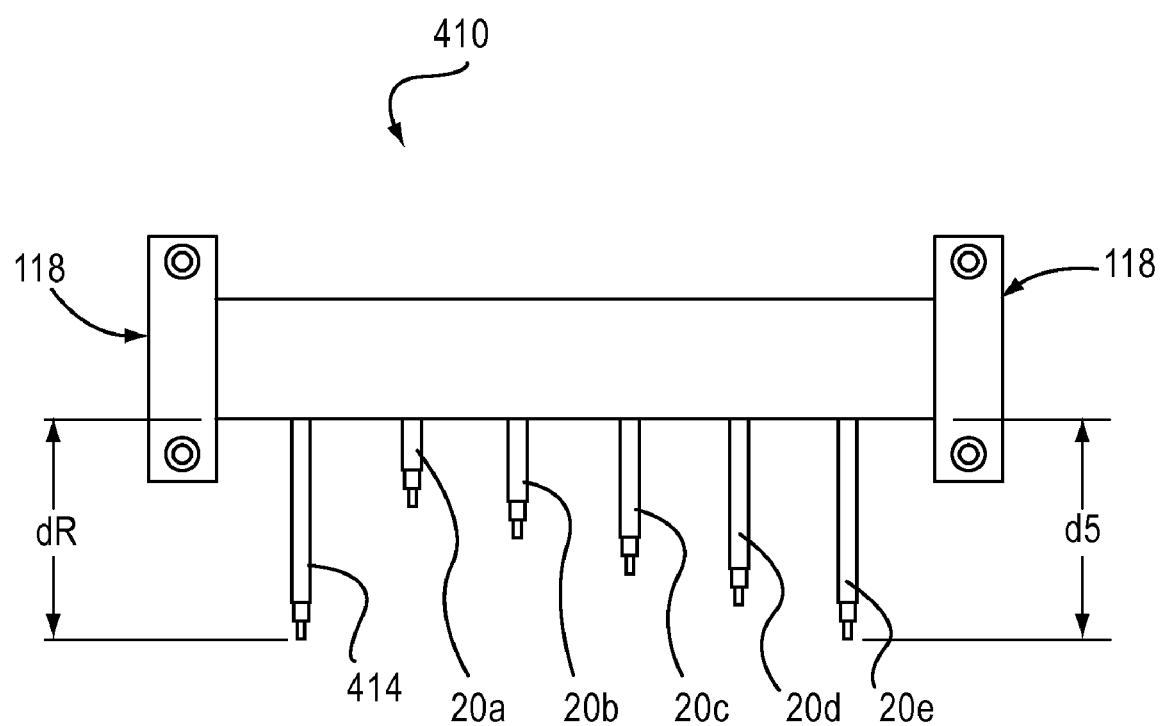
FIG. 18 is a top planner view of the ice thickness probe assembly illustrated in FIG. 17.

Again, with reference to FIGS. 8, 11 and 12, the reference bar 114 is disposed in a first plane Pf and the ice thickness probe 20 is disposed in a second plane Ps. Note that the first plane Pf and the second plane Ps are disposed apart from one another and simultaneously extend parallel to one another. In a similar fashion as shown in FIGS. 13, 15 and 17, the plurality of ice thickness probes are disposed in the second plane Ps and, as shown in FIGS. 13 and 15, the reference bars are disposed in the first plane Pf. In FIGS. 13 and 15, the first plane Pf and the second plane Ps are disposed apart from one another and simultaneously extend parallel to one another. Additionally, as illustrated in FIGS. 13-16, the plurality of ice thickness probes are disposed apart from one another in the lengthwise direction L and extend from the front surface 116f of the support member 116 of frame structure 112 in a parallel manner. In FIGS. 17 and 18, the plurality of ice thickness probes and the reference bar are disposed apart from one another in the lengthwise direction L and extend from the front surface 116f of the support member 116 of frame structure 112 in a parallel manner.

Another exemplary embodiment of an ice thickness probe 520 is illustrated in FIGS. 19 and 20. The ice thickness probe 520 is similar to the first exemplary embodiment of the ice thickness probe 20 discussed above except for the following features. The first probe rod end portion 22a of the probe rod 22 projects outwardly from the first insulator casing opening 24d1 of the insulator casing 24 while the insulator casing 24 and the sleeve 26 are disposed flush with one another as viewed in cross-section as shown in FIG. 20.

Yet another exemplary embodiment of an ice thickness probe 620 is illustrated in FIGS. 21 and 22. The ice thickness probe 620 is similar to the first exemplary embodiment of the ice thickness probe 20 discussed above except for the following features. The probe rod 22, the insulator casing 24 and the sleeve 26 are disposed flush with one another as viewed in cross-section as shown in FIG. 22.

Still yet another exemplary embodiment of an ice thickness probe 720 is illustrated in FIGS. 23 and 24. The ice thickness probe 720 is similar to the first exemplary embodiment of the ice thickness probe 20 discussed above except for the following features. The probe rod 22 and the insulator casing 24 are disposed flush with one another while both the probe rod 22 and the insulator casing 24 are recessed within the sleeve 26 as viewed in cross-section in FIG. 24.

The present invention, may, however, be embodied in various different forms and should not be construed as limited to the exemplary embodiments set forth herein; rather, these exemplary embodiments are provided so that this disclosure will be thorough and complete and will fully convey the scope of the present invention to those skilled in the art.

What is claimed is:

1. An ice thickness probe assembly configured to releasably connect to a tube, the ice thickness probe assembly comprising:
   a frame structure including an elongated support member and a pair of clamp members, each clamp member including a first half-block clamp part and a second half-block clamp part operative to releasably connect to each other with the tube being clamped therebetween, the support member being connected to and disposed between respective ones of the first half-block clamp parts and extending parallel to the tube;
   a reference bar including a pair of arms and a cross member interconnecting the pair of arms to form a generally U-shaped configuration, respective ones of the pair of arms connected to and extending perpendicularly from the support member in a forward direction, the reference bar fabricated from an electrically conductive material; and
   at least one ice thickness probe connected to and extending perpendicularly from the support member in the forward direction with the at least one ice thickness probe and the reference bar being disposed apart from one another, the reference bar and an end of the at least one ice thickness probe being retained by the support member to maintain the at least one ice thickness probe in a spaced parallel relationship to the pair of arms of the reference bar, with a gap between the end of the at least one ice thickness probe and the cross member of the reference bar, the at least one ice thickness probe including a probe rod fabricated from an electrically conductive material.

2. An ice thickness probe assembly according to claim 1, wherein the support member includes at least one probe-receiving hole extending through the support member sized to slidably receive the at least one ice thickness probe.

3. An ice thickness probe assembly according to claim 2, further comprising at least one fastener and wherein the support member includes at least one threaded hole extending perpendicularly from and in communication with the at least one probe-receiving hole, the at least one fastener and the at least one threaded hole in matable engagement with each other such that, when the at least one probe-receiving hole receives the at least one ice thickness probe, the at least one fastener is advanced in the at least one threaded hole to contact the at least one ice thickness probe to secure the at least one ice thickness probe in the at least one probe-receiving hole.

4. An ice thickness probe assembly according to claim 1, wherein the support member extends in a length-wise direction, a width-wise direction and a height-wise direction and is rectangularly shaped as viewed in cross section in the width-wise and height-wise directions, the support member having a front surface, a rear surface, a top surface and a bottom surface with the front and rear surfaces extending parallel to one another in the length-wise and height-wise directions and the top and bottom surfaces extending parallel to one another in the length-wise and width-wise directions and interconnecting the front and rear surfaces, the support member includes at least one probe-receiving hole extending through the front and rear surfaces, the at least on probe-receiving hole is sized to slidably receive the at least one ice thickness probe.

5. An ice thickness probe assembly according to claim 4, wherein the reference bar is connected to the bottom surface of the support member.

6. An ice thickness probe assembly according to claim 5, wherein the pair of arms and the cross member interconnecting the pair of arms to form a skewed generally U-shaped configuration.

7. An ice thickness probe assembly according to claim 1, wherein the pair of arms and the cross member interconnecting the pair of arms form an integral construction.

8. An ice thickness probe assembly according to claim 1, wherein the reference bar is fabricated from stiff yet resilient flat strip of electrically-conductive material.

9. An ice thickness probe assembly according to claim 1, wherein each one of the pair of arms has a connecting arm end portion integrally connected to opposing ends of the cross member, each one of the pair of arms extending from the connecting arm end portion and terminating in a free arm end portion.

10. An ice thickness probe assembly according to claim 9, wherein the support member has a flat bottom surface and the reference bar is fastened to the bottom surface of the support member at respective ones of the free arm end portions.

11. An ice thickness probe assembly according to claim 10, wherein the support member has a flat bottom surface and the reference bar is fastened to the flat bottom surface of the support member at respective ones of the free arm end portions.

12. An ice thickness probe assembly according to claim 1, wherein the at least one ice thickness probe includes a plurality of ice thickness probes and the support member extends in a length-wise direction, a width-wise direction and a height-wise direction and is rectangularly shaped as viewed in cross section in the width-wise and height-wise directions, the support member having a front surface, a rear surface, a top surface and a bottom surface with the front and rear surfaces extending parallel to one another in the length-wise and height-wise directions and the top and bottom surfaces extending parallel to one another in the lengthwise and width-wise directions and interconnecting the front and rear surfaces, the support member includes at least two probe-receiving holes extending through the front and rear surfaces and sized to slidably receive respective ones of the plurality of ice thickness probes.

13. An ice thickness probe assembly according to claim 1, wherein the cross member is disposed apart from the support member at a cross member distance and the at least one ice thickness probe extends from the support member at an ice thickness probe distance being less than the cross member distance.

14. An ice thickness probe assembly according to claim 13, wherein the at least one ice thickness probe is disposed between the pair of arms of the reference bar as viewed in plan view.

15. An ice thickness monitoring apparatus configured for use in a thermal storage coil assembly having a tank containing water and at least one coil tube initially disposed in the water so that, when the thermal ice storage coil assembly is energized, ice can be produced and accumulate on and around the at least one coil tube, the ice thickness monitoring apparatus comprising:
   a frame structure releasably connected to the at least one coil tube and including an elongated support member and a pair of clamp members, each clamp member including a first half-block clamp part and a second half-block clamp part operative to releasably connect to each other with the at least one tube being clamped therebetween, the support member being connected to and disposed between respective ones of the first half-block clamp parts and extending parallel to the at least one tube;
   a reference bar including a pair of arms and a cross member interconnecting the pair of arms to form a generally U-shaped configuration, respective ones of the pair of arms connected to and extending perpendicularly from the support member in a forward direction, the reference bar fabricated from an electrically conductive material;
   at least one ice thickness probe connected to and extending perpendicularly from the support member in the forward direction, the ice thickness probe and the reference bar being disposed apart from one another, the reference bar and an end of the at least one ice thickness probe being retained by the support member to maintain the at least one ice thickness probe in a spaced perpendicular relationship to the pair of arms of the reference bar, with a gap between the end of the at least one ice thickness probe and the cross member of the reference bar, the at least one ice thickness probe including a probe rod fabricated from an electrically conductive material; and
   a controller operative to transmit electrical signals to the reference bar so that the electrical signals received by the reference bar are transmitted to the at least one ice thickness probe via the water and operative to receive electrical signals detected by and from the at least one ice thickness probe in the water until the at least one ice thickness probe is enveloped in ice.

16. An ice thickness monitoring apparatus according to claim 15, wherein the at least one ice thickness probe includes a plurality of ice thickness probes, a first one of the plurality of ice thickness probes extending from the support member a first distance and a second one of the plurality of ice thickness probes extending from the support member a second distance being greater than the first distance.

17. An ice thickness monitoring apparatus according to claim 16, wherein the controller is operative to switch a light source in an ON state when ice envelopes the first one of the plurality of ice thickness probes and the controller is operative to de-energize the thermal storage coil assembly thereby discontinuing the production of ice when ice envelopes the second one of the plurality of ice thickness probes.

18. An ice thickness monitoring apparatus according to claim 16, wherein the plurality of ice thickness probes are disposed apart from one another and extend from the support member in a parallel manner relative to each other.

19. An ice thickness monitoring apparatus according to claim 18, wherein the reference bar is disposed in a first plane and the plurality of ice thickness probes are disposed in a second plane, the first plane and the second plane being disposed apart from and extending parallel to one another.

* * * * *